(12) United States Patent
Kim et al.

(10) Patent No.: US 8,662,065 B2
(45) Date of Patent: Mar. 4, 2014

(54) PORTABLE COMPOSITE ROASTER

(75) Inventors: Yong Jin Kim, Goyang-si (KR); Han Sik Kim, Jeollabuk-do (KR)

(73) Assignee: Yong Jin Kim, Goyang-Si, Gyeonggi-Do (KR)

( * ) Notice: Subject to any disclaimer, the term of this patent is extended or adjusted under 35 U.S.C. 154(b) by 321 days.

(21) Appl. No.: 13/318,604

(22) PCT Filed: May 8, 2010

(86) PCT No.: PCT/KR2010/002939
§ 371 (c)(1),
(2), (4) Date: Nov. 2, 2011

(87) PCT Pub. No.: WO2010/131875
PCT Pub. Date: Nov. 18, 2010

(65) Prior Publication Data
US 2012/0055464 A1  Mar. 8, 2012

(30) Foreign Application Priority Data

May 9, 2009  (KR) .................. 10-2009-0040496
May 8, 2010  (KR) .................. 10-2010-0043252

(51) Int. Cl.
*F24C 15/00*  (2006.01)

(52) U.S. Cl.
USPC .......... 126/9 R; 126/39 B; 126/15 R; 126/29; 126/30

(58) Field of Classification Search
USPC ....... 126/9 R, 39 B, 15 R, 25 R, 29, 30, 5, 40
See application file for complete search history.

(56) References Cited

U.S. PATENT DOCUMENTS 1,432,335 A * 10/1922 Howard ................... 126/344
4,632,089 A * 12/1986 Wardell .................. 126/25 R
7,168,425 B2 * 1/2007 Han et al. ................ 126/25 R

FOREIGN PATENT DOCUMENTS

| JP | 09-010120 A | 1/1997 |
| JP | 11-313768 A | 11/1999 |
| KR | 20-0378566 Y1 | 3/2005 |
| KR | 10-0719772 B1 | 5/2007 |

* cited by examiner

*Primary Examiner* — Alfred Basichas
(74) *Attorney, Agent, or Firm* — IM IP Law PLLC; C. Andrew Im (57) ABSTRACT

The present invention relates to a portable composite roaster that is small in size, enables a user to selectively use gas, charcoal or the like as a heating means, and is simple and convenient to use for anyone. The roaster has primary, secondary and tertiary heat-isolating screens arranged outside the heating means to effectively isolate heat and to protect a table on which the portable composite roaster is placed or users from heat generated by the heating means such that the users may use the roaster in accordance with the needs thereof. The portable composite roaster of the present invention enables users preferring charcoal-cooked food to roast food using charcoal, and enables users inconvenienced by charcoal to easily use gas instead of charcoal and enjoy delicious food.

5 Claims, 8 Drawing Sheets

PORTABLE COMPOSITE ROASTER

RELATED APPLICATIONS

This application is a §371 application from PCT/KR2010/002939 filed May 8, 2010, which claims priority from Korean Patent Application No. 10-2009-0040496 filed May 9, 2009 and Korean Patent Application No. 10-2010-0043252 filed May 8, 2010, each of which is herein incorporated by reference in its entirety.

TECHNICAL FIELD OF INVENTION

The present invention relates to a portable composite roaster, which can roast or stew meat or fishes.

In general, to cook food, various kinds of roasters for roasting flesh or meat with gas or charcoal have been widely used. In summer, people mainly roast meat in various meetings, parties, or outdoor activities. In this case, if they cannot prepare a gas roaster, charcoal roaster or other device for roasting meat, it sometimes makes people find no enjoyment in the meetings, parties or outdoor activities. When people do not prepare a device for roasting meat, some of them roast meat over an excessively big grill on a portable gas range, but in such a case, excessive heat is transferred to a gas tank and it sometimes causes an accident due to an explosion of the overheated gas tank. Accordingly, people need practical and safe portable roaster.

BACKGROUND OF THE INVENTION

In order to roast meat, a lot of preparatory work to buy all food materials including meat, prepare a portable gas range or a charcoal roaster for roasting meat and a grill is needed. However, because people sometimes miss some of the necessary things for roasting meat, it is difficult to meet the optimum conditions for roasting meat. Accordingly, if a device equipped with the above parts for roasting meat that interact with one another in a single system is invented, people can roast meat conveniently, safely and effectively using the roasting device.

OBJECT AND SUMMARY OF THE INVENTION

Accordingly, the present invention has been made in an effort to solve the above-mentioned problems occurring in the prior arts, and it is an object of the present invention to provide a portable composite roaster, which allows a user to selectively use gas or charcoal, which prevents that a heat source of charcoal or gas is transferred to the outside of the portable roaster, and which allows the user to selectively use a grill and a casserole pan according to the user's taste.

To achieve the above objects, the present invention provides a portable composite roaster including: water tank space parts surrounded by water tank outer side plates, a water tank outer bottom plate, water tank inner side plates and a water tank inner bottom plate for storing water therein; at least one cooling and evaporation space parts respectively opened in the upper sides and formed between the water tank outer side plates and the water tank inner side plates; an air inlet pipe formed in such a fashion as to pass through the water tank outer side plates and the water tank inner side plates for introducing air into the roaster from the outside; gas supply means mounted on one or both sides of the cooling and evaporation space parts for supplying fuel, such as gas, to the roaster; bottom gas combustion means mounted on the bottom of a combustion space part surrounded by the water tank space parts in order to burn gas supplied from the gas supply means; and side gas combustion means mounted or detachably mounted on the side of the combustion space part in order to burn gas introduced from the gas supply means to the side of the combustion space part.

Moreover, the water tank outer side plates, the water tank outer bottom plate, the water tank inner side plates, and the water tank inner bottom plate are made from material selected from a group that includes metal of stainless steel and aluminum, nonferrous metals, alloys, or thermosetting synthetic resin.

Furthermore, the portable composite roaster further includes a charcoal brazier detachably mounted in the combustion space part surrounded by the water tank space parts.

Additionally, the number of the water tank space part formed between the water tank outer side plates and the water tank inner side plates is one to four, and heat source supply holes of a round or polygonal shape are formed on the water tank outer bottom plate and the water tank inner bottom plate to receive a heat source from the bottom of the roaster.

In addition, the charcoal brazier includes: a rectangular frame formed by a bottom plate and inclined plates weld-bonded with one another and made with thin steel plates, the inclined plates having upper ends getting outwardly wider and inclined; one or two air inducing plate vertically mounted on one side or both sides of the inclined plates; an air inducing passage formed between the inclined plates and the air inducing plate; and a plurality of air holes formed on a boundary interface between the bottom plate and the inclined plate of the charcoal brazier, so that the air introduced through the air inducing passage is supplied to the inside of the brazier through the air holes.

The portable composite roaster according to the present invention can allow the user to selectively use various heat sources, such as charcoal, gas and others. Because the portable roaster adopts a double structure to prevent a heat source in safety, so that the user can enjoy roasting meat over the portable roaster on a table with an easy mind and even children can roast meat on the portable roaster in safety. Moreover, the user can cook food in wanted ways by selectively using a grill and a casserole pan according to the user's taste.

DETAILED DESCRIPTION OF THE EMBODIMENTS

Figure 1:
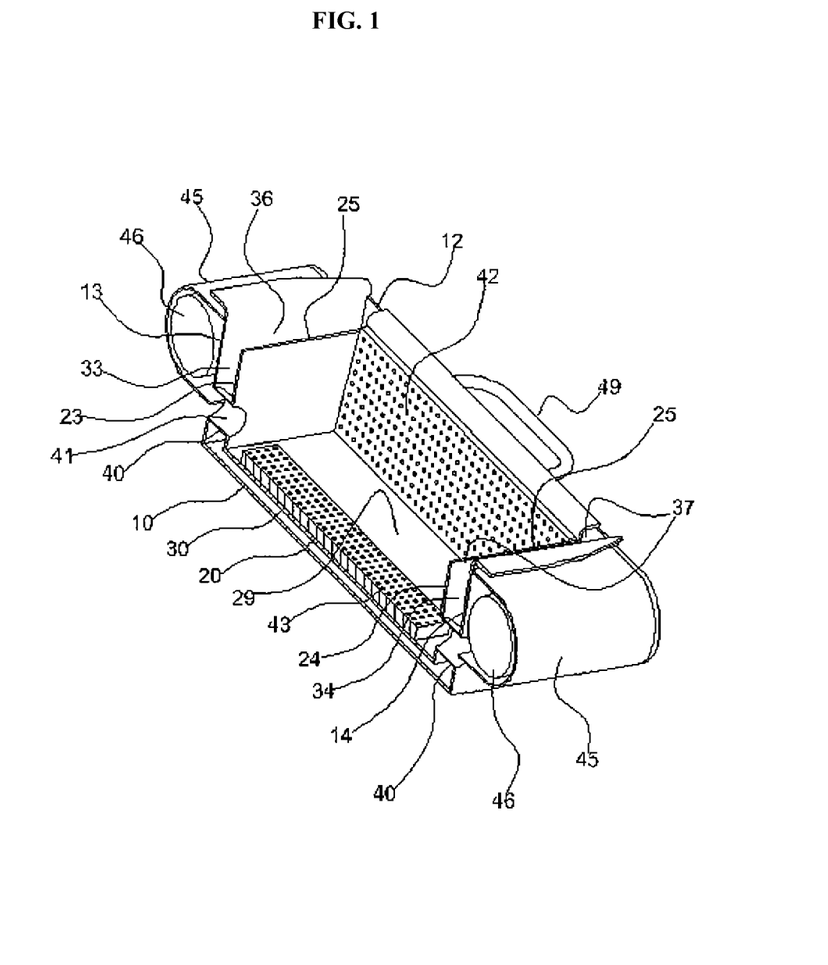
FIG. 1 is a perspective view, in a partial cross-section, of a portable composite roaster.
Figure 2:
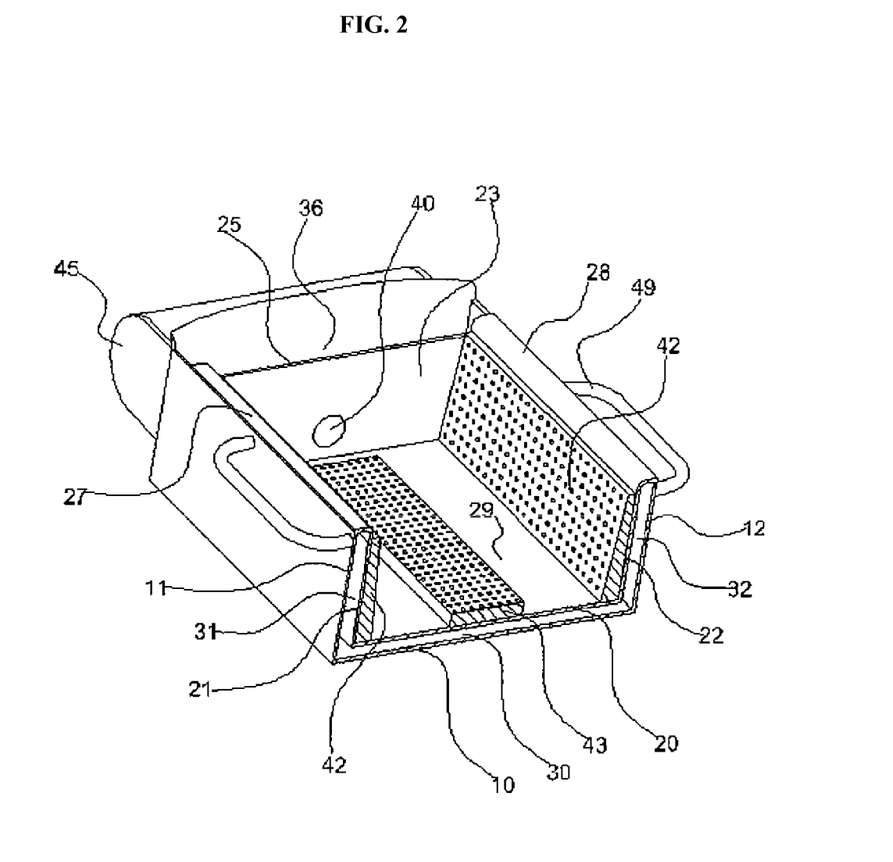
FIG. 2 is a perspective view, in a longitudinal section, of the portable composite roaster.
Figure 3:
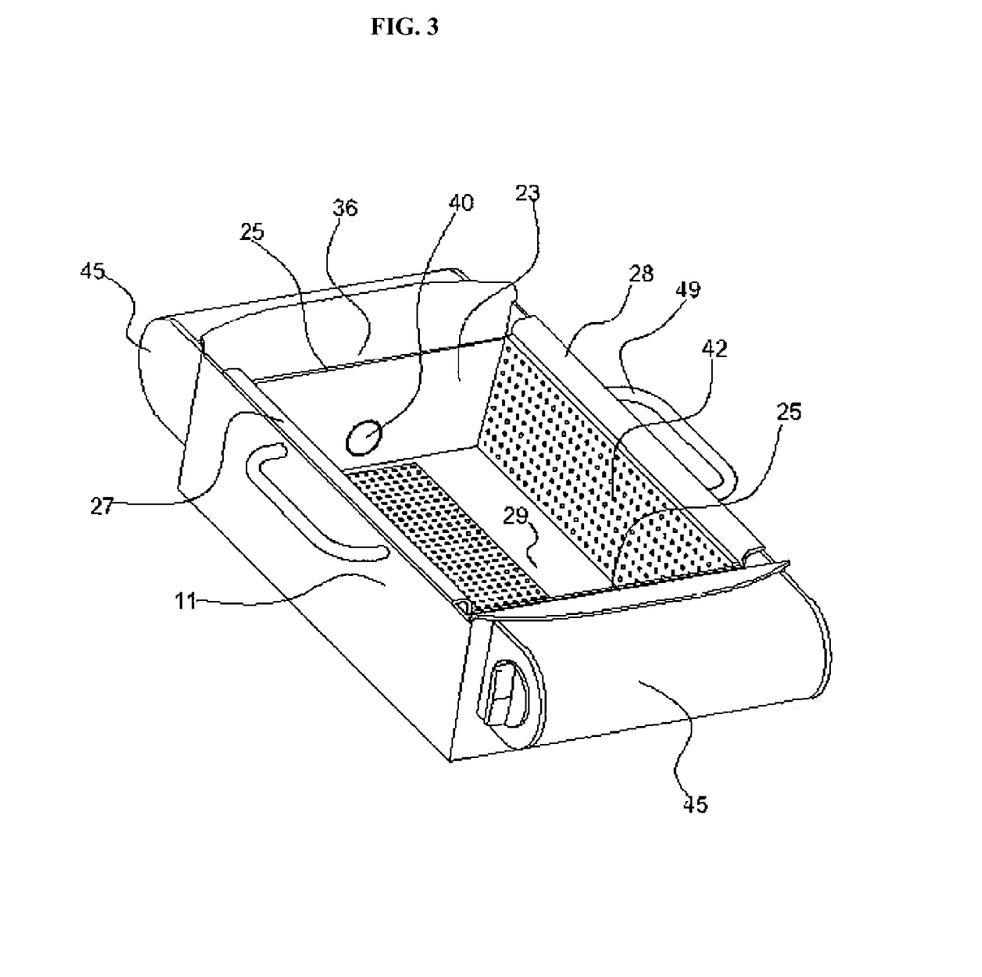
FIG. 3 is a perspective view of the portable composite roaster.

Reference will be now made in detail to the preferred embodiment of the present invention with reference to the attached drawings. In FIGS. 1, 2 and 3, a portable composite roaster includes water tank space parts for sealably storing water, the water tank space parts include: a rectangular outer frame being made of thin steel plates and having a water tank outer bottom plate 10 and water tank outer side plates 11, 12, 13 and 14; and a rectangular inner frame being smaller than the outer frame and having a water tank inner bottom plate 20 and water tank inner side plates 21, 22, 23 and 24; and a water tank fixing means 27, 28 for covering the water tank space parts for sealing water stored in the water tank space parts. In this instance, the parts of the water tank space parts are assembled by welding or bolt-and-nut fastening. Cooling and evaporation space parts 36 and 37 are formed between the water tank outer side plate 13 and the water tank inner side plate 23 and opened in the upper side. The cooling and evaporation space parts 36 and 37 respectively have holes perforating the water tank outer side plate 13 and the water tank inner side plate 23, and an air inlet pipe 40 for introducing air from the outside is inserted and mounted into the holes and passes through the cooling and evaporation space part 36.

The cooling and evaporation space part 37 serves to drop temperature of water by carrying heat while steam is evaporated when water stored in the water tank space parts 30, 31, 32, 33 and 34 is heated. Here, one or four water tank space parts may be formed, and according to the need, two or three water tank space parts may be formed. In the case that the water tank space parts less than four are formed, in order to remove the water tank spaces, the inner plates and the outer plates at are attached integrally to each other.

Upper end portions of the water tank outer side plates 13 and 14 are different in height from upper end portions of the water tank inner side plates 23 and 24 and are bent inwardly or outwardly, so that a user can easily assemble them.

A bottom gas combustion means 43 having a plurality of holes is mounted on the water tank inner bottom plate 20 of a combustion space part 29 to burn gas supplied from the bottom. Furthermore, side gas combustion means 42 respectively having a plurality of holes are mounted on the water tank inner side plates 21 and 22 to burn gas supplied from the sides of the inner combustion space part. The side gas combustion means 42 and the bottom gas combustion means 43 may be heating plates made of ceramic material, and alternatively, gas combustion means of other types may be used.

The ceramic heating plates have several merits in that they provide good thermal efficiency and evenly diffuse temperature of fire. One or two gas supply means 45 and 46 are selectively mounted on outer faces of the water tank outer side plates 13 and 14. Various kinds of fuel tanks for supplying gas, such as butane gas, LPG gas, and others, may be mounted.

Figure 4:
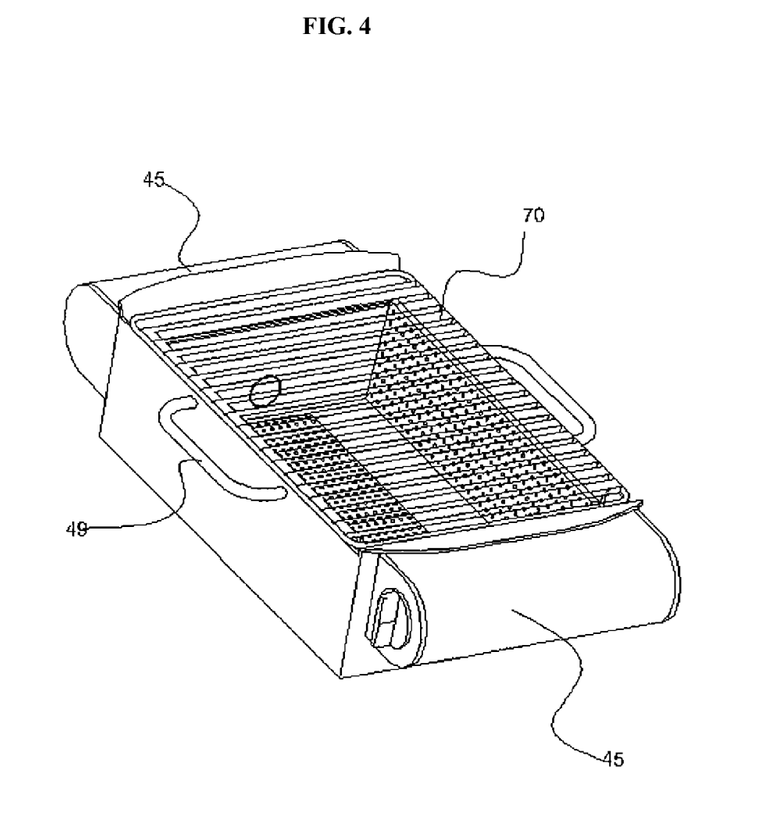
FIG. 4 is a perspective view showing a state where a grill is put on the portable composite roaster of FIG. 3.

The side gas combustion means 42 and the bottom gas combustion means 43 burn gas simultaneously or in order to provide a heat source of a desired temperature, and then, diffuse heat to the inner combustion space part 29 evenly to thereby evenly transfer heat to a grill 70 of the portable roaster as shown in FIG. 4, so that the portable roaster can cook or roast food. In this instance, outdoor air is introduced to the inside of the roaster through the air inlet pipe 40 so as to sufficiently supply necessary air.

Reference No. 49 indicates handle of portable roaster for moving.

Figure 5:
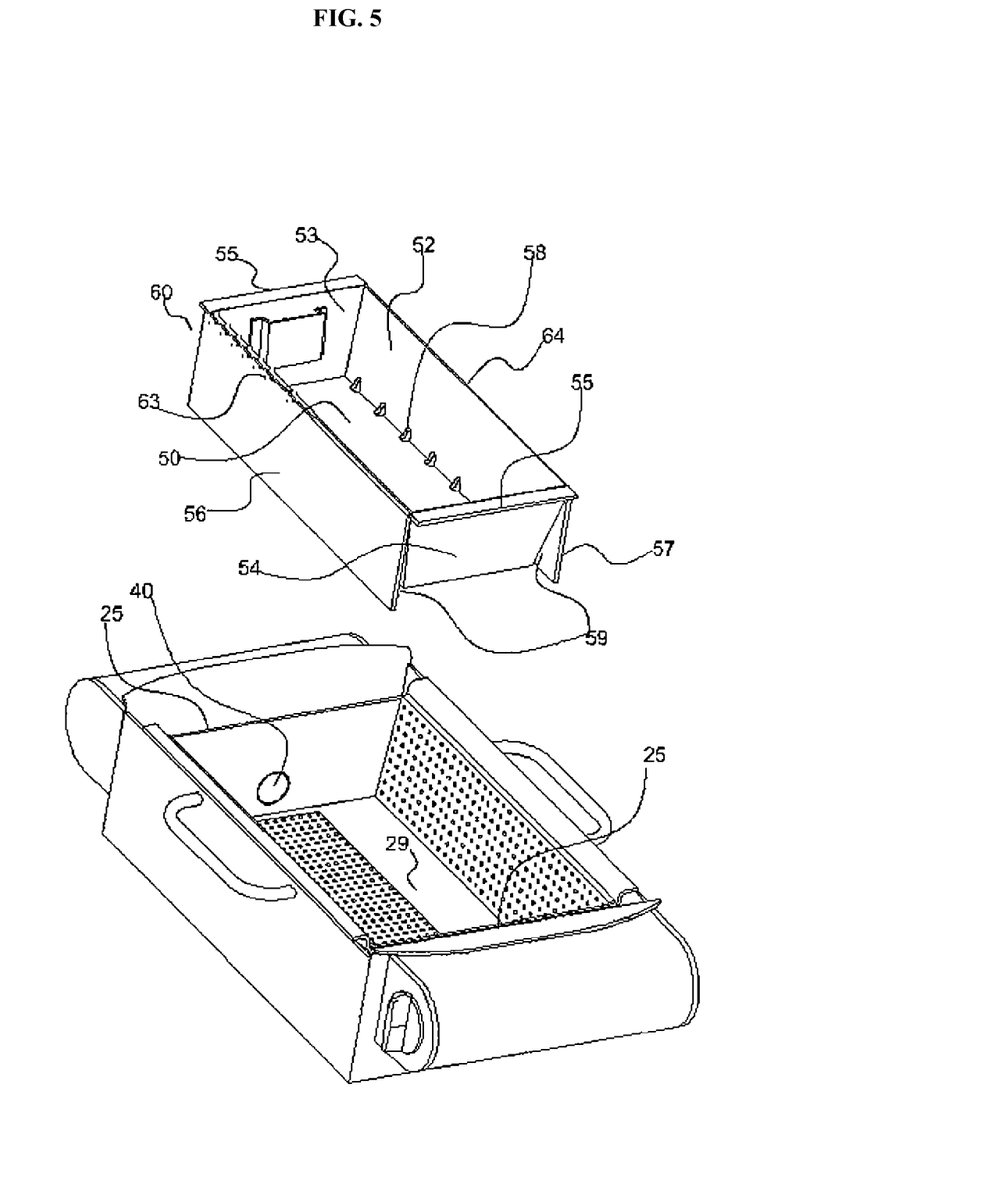
FIG. 5 is a perspective view showing a state where a charcoal brazier is put on the portable composite roaster.
Figure 6:
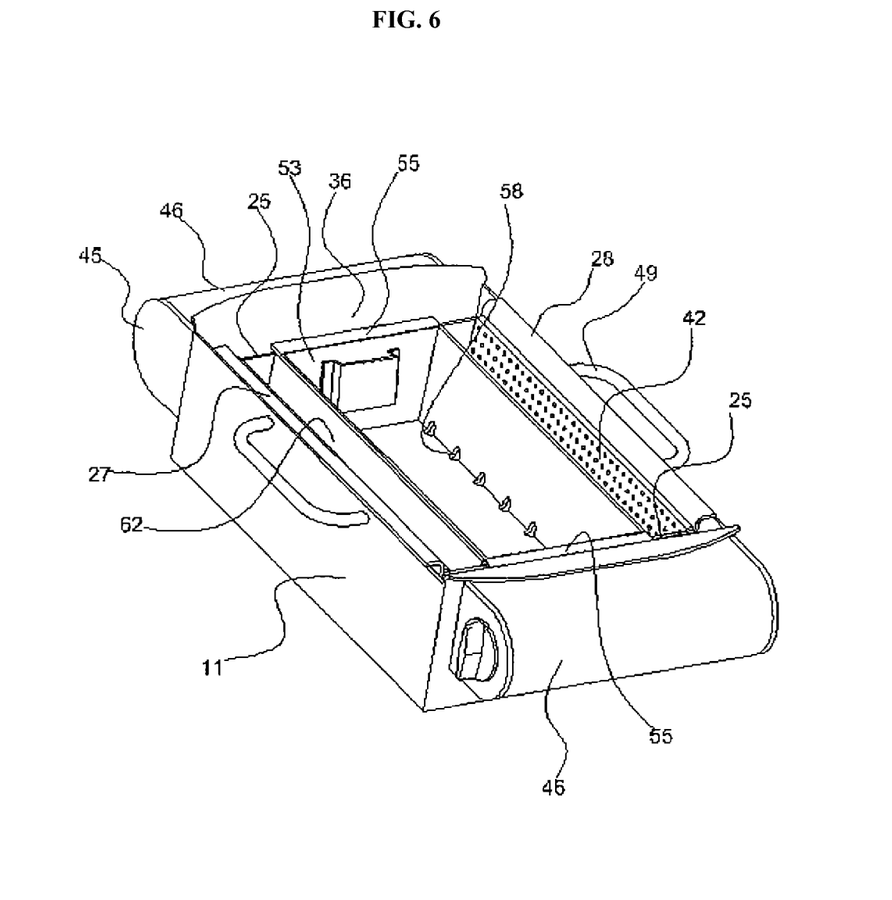
FIG. 6 is a perspective view showing a state where the charcoal brazier 60 of FIG. 5 is assembled to a combustion space part 29.
Figure 7:
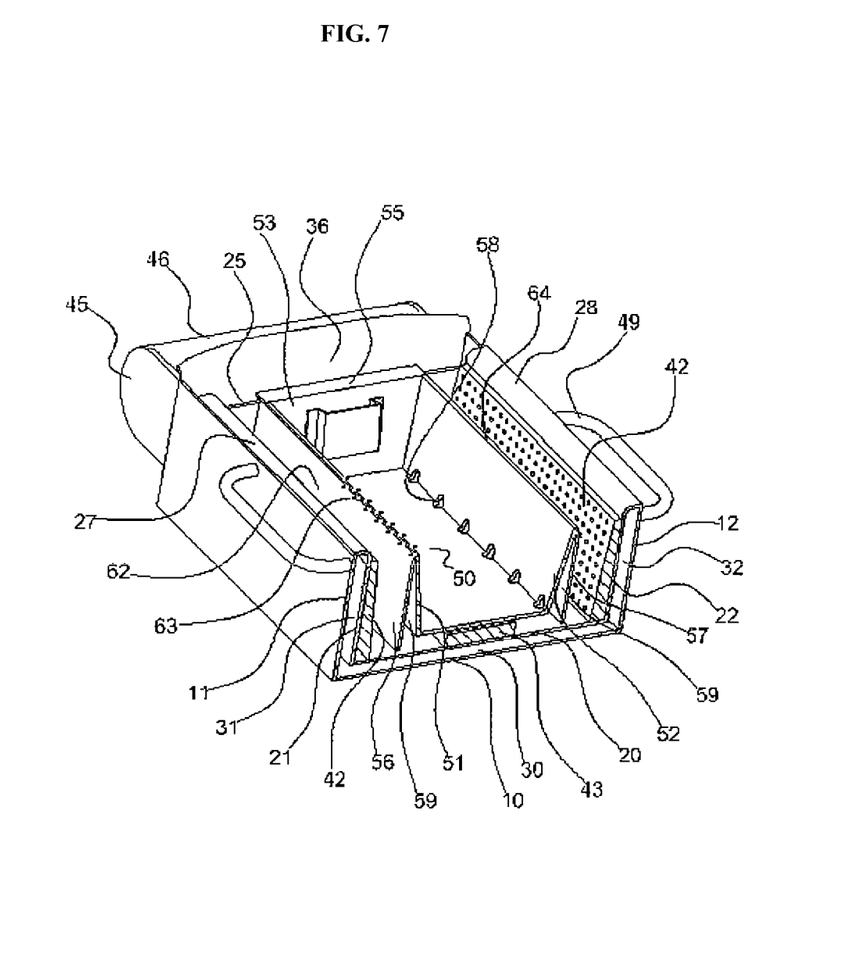
FIG. 7 is a cross-sectionally perspective view showing the state where the charcoal brazier 60 is assembled to the combustion space part 29.

As shown in FIGS. 5, 6 and 7, a charcoal brazier 60 using charcoal as a heat source has the following configuration. The charcoal brazier 60 includes: a rectangular bottom plate 50 made with a thin steel plate; inclined plates 51, 52, 53 and 64 weld-bonded with one another and with the bottom plate 50, the inclined plates 51, 52, 53 and 54 respectively having upper end portions inclined outwardly (namely, getting gradually wider in the upper direction); and one or two air inducing plate 56 vertically attached to an outer face of the inclined plate disposed one or two sides of the charcoal brazier 60.

An air inducing passage 59 is formed between the inclined plates forming an inner frame of the charcoal brazier 60 and the air inducing plate 56 disposed on the outer face of the inclined plate, so that air can be introduced into the charcoal brazier 60 through the air inducing passage 59.

Furthermore, a plurality of air holes 58 are formed on a boundary interface between the bottom plate 50 and the inclined plate (corresponding to side walls of the charcoal brazier) of the charcoal brazier 60, so that the air introduced through the air inducing passage 59 is supplied to the inside of the brazier through the air holes 58. Sliding guide means 55 are horizontally formed at the tops of the inclined plates 53 and 54 of the charcoal brazier in such a way as to be put over an upper end portion 25 of the water tank inner side plate. Moreover, the sliding guide means 55 are laterally movable in a state where they are put over the upper end portion 25 of the water tank inner side plate, so that the user can move the sliding guide means 55 if necessary when using the charcoal brazier. The outdoor air introduced into the roaster through the air inlet pipe 40 passes through the air holes 58 after passing the air inducing passage 59, and then, is introduced to the inner space of the charcoal brazier to sufficiently supply air for burning charcoal and to supply good firepower.

Figure 8:
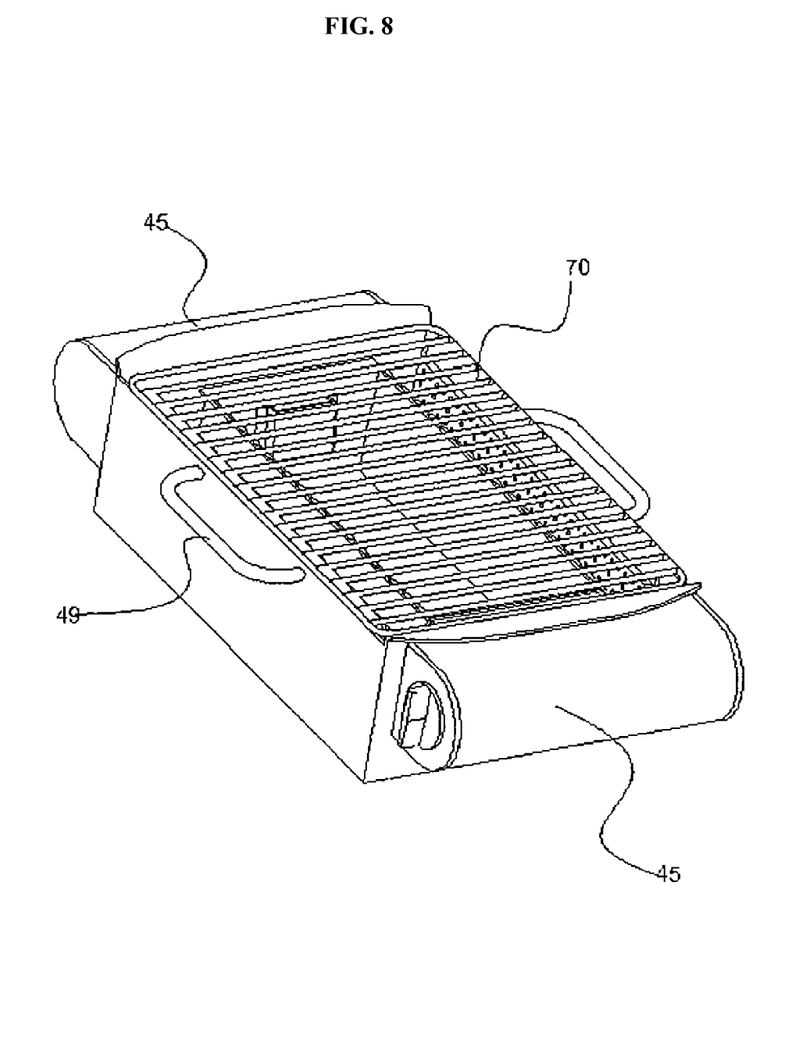
FIG. 8 is a perspective view showing an assembled state of a grill 70 of FIG. 6.

The portable roaster according to the present invention can cook food, such as meat, on the grill 70 with gas burning by the side gas combustion means 42 and the bottom gas combustion means 43, and in the case that gas is not used, allow the user to conveniently cook food using the charcoal brazier 60.

The portable roaster according to the present invention may be also manufactured as a charcoal-only roaster by removing the gas supply means 45, the side gas combustion means 42 and the bottom gas combustion means 43.

The portable roaster can absorb the inside heat of the roaster and cool the roaster by emitting the heat to the outside due to the convection current of water stored in the water tank space parts 30, 31, 32, 33 and 34, so that the water tank outer bottom plate and parts around the water tank outer bottom plate can keep temperature at about 100 degrees, and hence, the user can conveniently use the portable roaster on a table.

The invention claimed is:

1. A portable composite roaster comprising:
water tank space parts surrounded by water tank outer side plates, a water tank outer bottom plate, water tank inner side plates and a water tank inner bottom plate for storing water therein;
at least one cooling and evaporation space parts respectively opened in the upper sides and formed between the water tank outer side plates and the water tank inner side plates;
an air inlet pipe formed in such a fashion as to pass through the water tank outer side plates and the water tank inner side plates for introducing air into the roaster from the outside;
gas supply means mounted on one or both sides of the cooling and evaporation space parts for supplying fuel, such as gas, to the roaster;
bottom gas combustion means mounted on the bottom of a combustion space part surrounded by the water tank space parts in order to burn gas supplied from the gas supply means; and
side gas combustion means mounted or detachably mounted on the side of the combustion space part in order to burn gas introduced from the gas supply means to the side of the combustion space part.

2. The portable composite roaster according to claim 1, wherein the water tank outer side plates, the water tank outer bottom plate, the water tank inner side plates, and the water tank inner bottom plate are made from material selected from a group that includes metal of stainless steel and aluminum, nonferrous metals, alloys, or thermosetting synthetic resin.

3. The portable composite roaster according to claim 1, wherein the number of the water tank space part formed between the water tank outer side plates and the water tank inner side plates is one to four, and wherein heat source supply holes of a round or polygonal shape are formed on the water tank outer bottom plate and the water tank inner bottom plate to receive a heat source from the bottom of the roaster.

4. The portable composite roaster according to claim 1, further comprising a charcoal brazier detachably mounted in the combustion space part surrounded by the water tank space parts.

5. The portable composite roaster according to claim 4, wherein the charcoal brazier comprises:

a rectangular frame formed by a bottom plate and inclined plates weld-bonded with one another and made with thin steel plates, the inclined plates having upper ends getting outwardly wider;

one or two air inducing plate vertically mounted on one side or both sides of the inclined plates;

an air inducing passage formed between the inclined plates and the air inducing plate; and a plurality of air holes formed on a boundary interface between the bottom plate and the inclined plate of the charcoal brazier, so that the air introduced through the air inducing passage is supplied to the inside of the brazier through the air holes.

\* \* \* \* \*